United States Patent [19]
Peek

[11] Patent Number: 5,170,487
[45] Date of Patent: Dec. 8, 1992

[54] PAGING SYSTEM WITH MULTIPLE FREQUENCIES AND MULTIPLE PROTOCOLS

[75] Inventor: William H. Peek, Beaverton, Oreg.

[73] Assignees: Seiko Corp.; Seiko Epson Corp., both of Japan

[21] Appl. No.: 662,097

[22] Filed: Feb. 28, 1991

Related U.S. Application Data

[63] Continuation-in-part of Ser. No. 299,710, Jan. 19, 1989, abandoned.

[51] Int. Cl.[5] .............................................. H04B 7/00
[52] U.S. Cl. ................................. 455/45; 340/825.44
[58] Field of Search ................... 455/33, 45, 101–103, 455/132–133; 340/825.44, 825.73, 825.04; 379/57

[56] References Cited
U.S. PATENT DOCUMENTS

| | | | |
|---|---|---|---|
| 3,961,143 | 6/1976 | Thyssens | 340/825.04 |
| 4,644,347 | 2/1987 | Lucas et al. | 340/825.04 |
| 4,891,638 | 1/1990 | Davis | 340/825.44 |

FOREIGN PATENT DOCUMENTS

9003041 3/1990 World Int. Prop. O. ...... 340/825.04

Primary Examiner—Edward L. Coles, Sr.
Assistant Examiner—Kinfe-Michael Negash
Attorney, Agent, or Firm—Elmer Galbi

[57] ABSTRACT

The present invention provides a pager system which integrates a plurality of transmitters which operate at different frequencies. Some of the transmitters transmit paging messages using FM subcarrier signals (termed FM-SCA signals) and some transmit messages using a modulated carrier (termed RCC signals). The receiver includes two front ends. One front end receives and demodulates FM-SCA signals and one front end receives and demodulates RCC signals. Each paging message is transmitted on both FM-SCA transmitters and on RCC transmitters. The signals on each of the transmitters are slightly off set in time. When an assigned time slot occurs, one receiver turns on and attempts to receive a message, if it does not receive an appropriate signal, it tunes to another station that is in a stored list of stations. If the next station has an RCC flag associated therewith the RCC receiver rather than the FM-SCA receiver is operated. The entire process is controlled by a microprocessor which is a part of the system.

7 Claims, 2 Drawing Sheets

PAGING SYSTEM WITH MULTIPLE FREQUENCIES AND MULTIPLE PROTOCOLS

RELATED APPLICATIONS

This Application is a continuation-in-part of co-pending application serial number 07/299710, filed Jan. 19, 1989 now abandoned, entitled "Paging System with Multiple Frequencies and Multiple Protocols".

FIELD OF THE INVENTION

The present invention relates to communications systems, and more particularly to electronic paging systems.

BACKGROUND OF THE INVENTION

The radio common carrier (RCC) pager industry began in the mid-1940s when the Federal Communications Commission (FCC) began allocating frequencies for local communication services. Several different types of electronic paging systems have been developed and several different types of systems are in widespread use. The need for standards is well recognized and several different competing standards have been developed.

One of the most commonly used formats is the POCSAG coding format. This format was developed by the British Post Office "Post Office Codes Standardization Advisory Group". Other existing formats are the GOLAY sequential code format (sometimes called GSC) which is often attributed to Motorola, the D1 and D2 formats which were developed by the NEC Corporation, and the FM subcarrier protocol which is shown in U.S. Pat. No. 4,713,808 (Gaskill).

No single protocol has been able to capture universal or near universal acceptance. The reason for this is that each protocol generally has advantages and disadvantages. For example, the GOLAY protocol requires more air time per message than does the POCSAG protocol; however, the POCSAG protocol does not support voice paging, whereas the GOLAY does support most voice paging. The GOLAY protocol provides a greater degree of error correction because the messages are encoded with more redundancy than are the POCSAG messages. However, this added redundancy is the reason that the GOLAY protocol requires more airtime. Thus, in each application the advantages and disadvantages of each protocol must be balanced to achieve optimum performance.

In addition to using various possible transmission protocols, pagers may operate at any one of a variety of frequencies. The Federal Communications Commission (FCC) has set aside several parts of the radio frequency spectrum for use by RCC radio paging systems. More recently, the Federal Communication Corporation began allocating frequencies in the 900 MHz for use by nationwide paging systems. The frequencies set aside by the FCC are:

a) 30–50 MHz (low band VHF)
b) 148–174 MHz (high band VHF)
c) 450–512 MHz (UHF)
d) 900–950 MHz (900 MHz space band)
f) 88–108 MHz (FM-SCA or FM-Subcarrier or Subcarrier Communication Authorization )

In order to accommodate the various protocols, sophisticated paging devices have been developed which can accommodate multiple protocols. For example, U.S. Pat. No. 4,518,961 (Davis), which is assigned to Motorola, describes a battery-powered pager which is capable of processing detected signals in accordance with plurality of de-coding schemes. This pager includes a micro-processor which detects which coding scheme is being used, and then de-codes the message in accordance with the appropriate protocol.

Some pagers can handle signals on more than one frequency. For example, an FM-subcarrier (SCAG) pager being marketed by the CUE Paging Corporation (formerly called DiversiCom) scans the FM frequencies to find a frequency which has an FM-SCA signal of the type broadcast the CUE system. When the pager determines an appropriate signal on one of the FM frequencies, it stays tuned to that frequency and receives the paging message.

A system developed by AT&E Corporation, some aspects of which are shown in U.S. Pat. Nos. 4,713,808 and 4,897,835, transmits using a time slot protocol on an FM subcarrier of commercial FM stations. In the system shown in the above patents, the same message is transmitted on a number of different stations, the transmissions being slightly offset one from another, so that if when a receiver turns on in its assigned time slot, it misses a message, in a very short time it can tune to another station, then to still another station, etc to try to receive the message.

None of the prior art systems can receive messages which are transmitted both on an FM-SCA system and messages transmitted over an RCC system using the POCSAG or the GOLAY protocol. Likewise, none of the systems can receive signals on the VHF-UHF or 900 mega-hertz band and also detect signals in the FM-SCA band.

One of the problems encountered by systems using FM-SCA signals that are transmitted over commercial FM stations is that certain areas are "dead-spots" where signals can not be received. The cost of installing additional FM transmitters which operate using the FM-SCA system to cover dead spots is generally prohibitive, hence, it is desirable to utilize existing or new RCC systems in areas where transmissions dead spots occur. However, no existing pagers can accept both FM-SCA signals and RCC signals.

The present invention provides a system which includes a plurality of transmitters operating at different frequencies and using different protocols and an improved pager which can automatically accept both RCC and FM-SCA signals.

SUMMARY OF THE INVENTION

The present invention provides a pager system which integrates a plurality of transmitters which operate at different frequencies. Some of the transmitters transmit paging messages using FM subcarrier signals (termed FM-SCA signals) and some transmit messages using a modulated carrier (termed RCC signals). The receiver includes two front ends. One front end receives and demodulates FM-SCA signals and other front end receives and demodulates RCC signals. Each paging message is transmitted on both FM-SCA transmitters and on RCC transmitters. The signals on each of the transmitters are slightly off set in time. When an assigned time slot occurs, one receiver turns on and attempts to receive a message, if it does not receive an appropriate signal, it tunes to another station that is in a stored list of stations. If the next station has an RCC flag associated therewith the RCC receiver rather than the FM-SCA receiver is operated. The entire process is controlled by a microprocessor which is a part of the system.

The foregoing and other objects, features and advantages of the invention will be apparent from the more particular description of preferred embodiments of the invention, hereinafter described and illustrated in the accompanying drawing. While the invention will be described with reference to preferred embodiments thereof, it will be understood by those skilled in the art that various changes in form and details may be made without departing from the spirit, scope, and teaching of the invention.

From the following description of preferred embodiments of the invention, those skilled in the art will recognize a wide variety of applications for the method and apparatus is possible without departing from the spirit, scope and teaching of the invention.

DETAILED DESCRIPTION OF THE INVENTION

Figure 1:
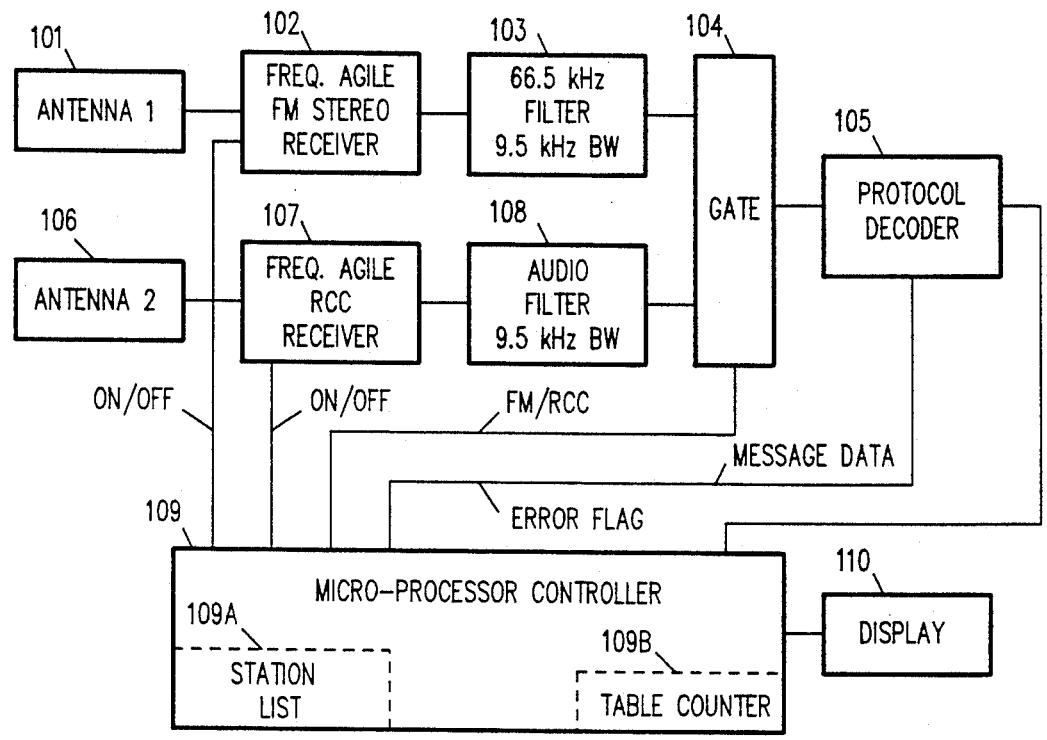
FIG. 1 is an overall block diagram of a paging receiver built in accordance with the present invention.

An overall block diagram of a preferred embodiment of the present invention is shown in FIG. 1. The receiver system includes two front end sections. The first front end section is designed to receive FM stereo signals and it includes antenna 101, frequency agile stereo receiver 102, and a 66.5 kHz band pass filter 103 which has a 9.5 kHz wide pass band. These components can be similar to the components shown in issued U.S. Pat. No. 4,713,808 (Gaskill).

The second font end section is designed to receive RCC signals and it includes antenna 106, frequency agile receiver 107, and audio filter 108. These components can be similar to those in commercially available RCC pagers or similar to those shown in U.S. Pat. No. 4,849,750 (Andros) or in various other issued patents which show RCC paging receivers.

The output of filters 103 and 108 go through gate 104 to protocol decoder 105. The receivers 102 and 107 are turned on and off by microprocessor controller 109. Likewise gate 104 and protocol decoder 105 are controlled by microprocessor 109. The program in microprocessor controller 109 will be explained later.

Microprocessor controller 109A includes a memory 105A which includes normal control programs and station list 109A. The station list 109A is a table that the microprocessor uses to determine which receiver should be activated. In the specific embodiment shown the station list 109A is:

| Table count | Channel | Receiver | Comment |
|---|---|---|---|
| 0 | 95.5 | 102 | FM-SCA type transmitter 202 |
| 1 | 98.5 | 102 | FM-SCA type transmitter 203 |
| 2 | 101.1 | 102 | FM-SCA type transmitter 205 |

-continued

| Table count | Channel | Receiver | Comment |
|---|---|---|---|
| 3 | 149.6 | 107 | RCC type transmitter 204 |
| 4 | 150.35 | 107 | RCC type transmitter 206 |

Figure 4:
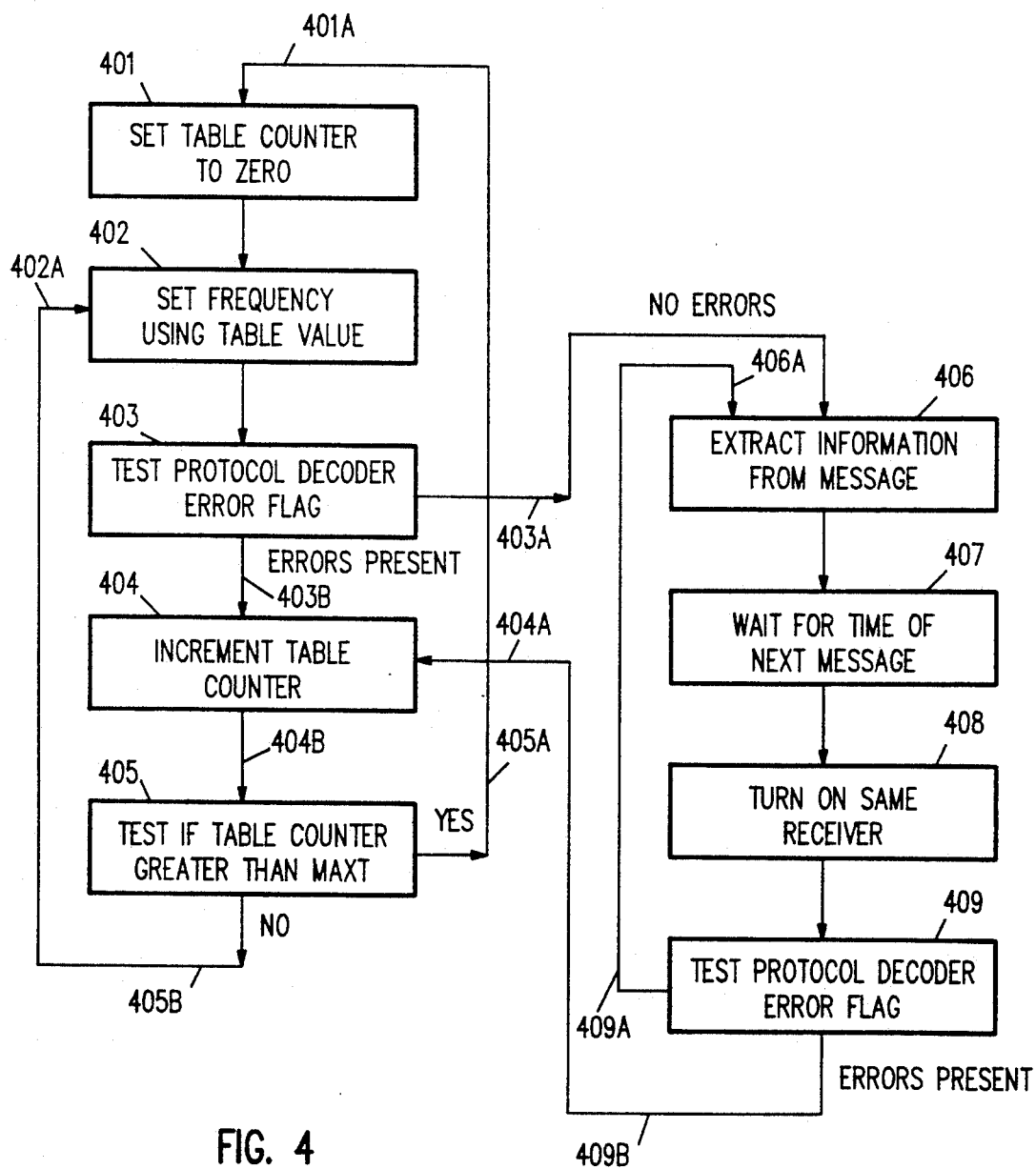
FIG. 4 is a block flow diagram of the operation of the system.

The manner in which the above list is used by the program in microprocessor 109 will be explained later with reference to FIG. 4. Note: With the above table MAXT shown in FIG. 4 equals "4".

Figure 2:
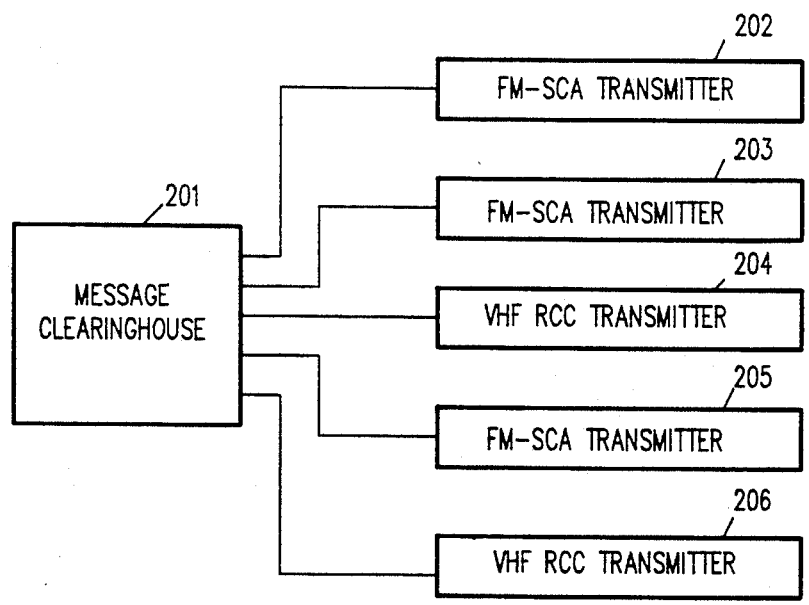
FIG. 2 is a block diagram of a system of transmitters designed to operate in accordance with the present invention.

FIG. 2 shows the message distribution or message clearinghouse 201 which receives messages via telephone and sends them to radio transmitters 202 to 206. The message clearinghouse 201 can be similar to the message Clearinghouse shown in issued U.S. Pat. No. 4,713,808 (Gaskill) or in issued U.S. Pat. No. 4,897,835 (Gaskill). The messages are sent from the clearinghouse 201 to the Transmitters 202 to 206 in time offset fashion as shown in U.S. Pat. No. 4,897,835 (Gaskill). The messages can be transmitted using the message protocol set out in issued U.S. Pat. No. 4,713,808 (Gaskill) or in issued U.S. Pat. No. 4,897,835 (Gaskill).

Figure 3:
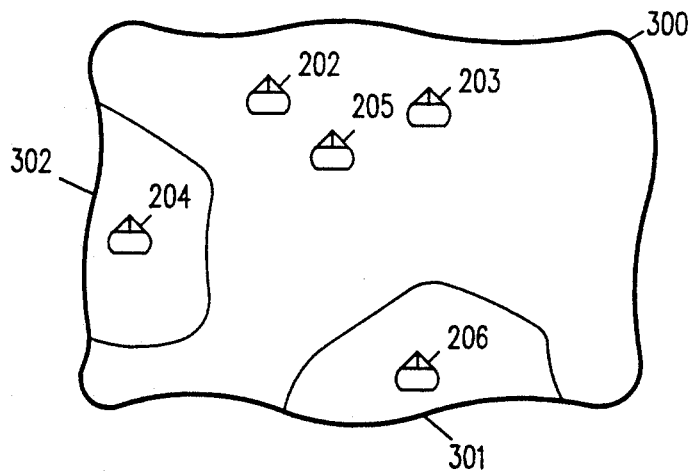
FIG. 3 is an illustrative example of a pattern of coverage of several transmitters which could be used with a system operating in accordance with the present invention.

The stations shown in FIG. 2 are located as shown in FIG. 3. The FM stations 202, 203, and 205 are located such that their signal covers the entire area 300 except areas 301 and 302. RCC transmitter 206 is located so that its signal covers area 301 and RCC transmitter 204 is located so that its signal covers area 302.

In general the system operates as follows: The receiver shown in FIG. 1 is initially activated with one of the front end receivers 102 or 107 active. Which receiver is chosen to be initially active is relatively arbitrary; however, in the specific embodiment shown here, initially receiver 202 is active. The initially active receiver is only activated on a time slot basis as described in the above reference patent. That is, the receiver is activated in a time slot that is assigned to the particular receiver. How the transmitters and receivers are initially coordinated is not part of the present invention and it can be done as shown in the above referenced patent.

If the initially activated receiver receives a good information packet during its assigned time slot, the packet is interpreted, any messages are extracted by protocol decoder 105 and the receiver goes dormant until its assigned time slot again occurs. The process then repeats.

If when receiver 102 is initially activated it does not receive a good information packet, the station list is interrogated and the receiver specified on the next line of the station list is activated. The process then repeats. FIG. 4 gives a more detailed explanation of the process. Stated differently, the program in microprocessor 109 operates according to the program shown in FIG. 4.

Block 401: Initially the table counter 109B is set to "zero".

Block 402: The receiver specified on line zero is activated at the frequency specified on line zero.

Block 403: The error flag generated by protocol decoder 105 is tested and the program then branches to either blocks 404 or 406 depending on the result of the test.

Block 404: If an error is present indicating that the protocol decoder did not find a valid message, the table counter is incremented.

Block 405: A test is done to determine if the table counter has been incremented past the last value in the table and if so, the program goes back to block 401. If the limit has not been reached the program branches back to block 402.

Block 406: If the test conducted by block 403 indicates that there is no error flag, the information is extracted from the message as described in the previously referenced patent.

Block 407: The system then goes inactive to wait for the arrival of the next assigned time slot.

Block 408: After the appropriate time interval, that is, when the assigned time slot next occurs, the same receiver as previously active is again activated. There is a high probability that if the receiver previously could receive a message, it will again be able to receive a message on the same frequency.

Block 409: The error flag is again tested. If there is no error the program branches to block 406 and the sequence repeats with the same transmitter and the same frequency If there is an error a new frequency or transmitter (as determined by the station list table) is tried by branching to block 404.

While the invention has been shown and described with respect to an embodiment that included a relatively short station list, the station list could be much longer. For example in another embodiment the station list could be:

| TABLE COUNT | CHANNEL |
| --- | --- |
| 0 | 149.00 |
| 1 | 148.05 |
| 2 | 149.60 |
| 3 | 149.65 |
| 4 | 149.70 |
| 5 | 149.75 |
| 6 | 150.30 |
| 7 | 150.35 |
| 8 | 150.40 |
| 9 | 155.35 |
| 10 | 155.40 |
| 11 | 155.45 |
| 12 | 155.50 |
| 13 | 160.05 |
| 14 | 160.10 |
| 15 | 160.15 |
| 16 | 160.20 |
| 17 | 160.25 |
| 18 | 87.5 |
| 19 | 87.6 |
| 20 | 87.7 |
| 21 | 87.8 |
| 22 | 87.9 |
| 23 | 88.0 |

In the specific embodiment of the invention shown here, each of the radio station transits messages using the same message transmission protocol. An alternate embodiment of the invention utilizes several protocols. For example, the station list could have an additional entry on each line which indicated which protocol was being used by that station such as the following:

| Table count | Channel | Receiver | TYPE |
| --- | --- | --- | --- |
| 0 | 95.5 | 102 | Protocol A |
| 1 | 98.5 | 102 | Protocol A |
| 2 | 101.1 | 102 | Protocol A |
| 3 | 149.6 | 107 | Protocol B |
| 4 | 150.35 | 107 | Protocol B |

In this alternate embodiment of the invention, when the microprocessor 109 sent a signal to change which station was should be activated, it would also send a signal to protocol decoder 105. In the simplest case there could be a plurality of decoders and the microprocessor would merely select the appropriate decoder. In a more complex system, the protocol decoder would be a programmed device, and one would merely select a different decoding subroutine.

The present invention is not related to the physical configuration of the system shown and described herein, however, the receiver shown in FIG. 1 could be fabricated from various off the shelf components and it such case it would be relatively large, that is, about the size of present day cellular telephone. Alternatively the system could be fabricated from specially designed integrated circuits and in such a case it could be built with the form factor of a wristwatch similar to the wristwatch receiver shown in the previously referenced patent applications.

It should also be understood that changes may be made in the combination and arrangement of steps and apparatus heretofore set forth in the specification and drawings. Such changes may be made without departing from the spirit and scope of the invention as defined in the following claims.

I claim:

1. A pager system which integrates a plurality of transmitters which transmit the same paging message of times, said transmissions having a time offset from each other and including a flag indicating the protocol being used:

a first plurality of transmitters which transmit said messages on FM subcarrier signals, a second plurality of transmitters which transmit said messages as modulated RCC signals, a receiver which includes, a first front end that can receive messages transmitted on an FM subcarrier using a first protocol, a second front end that can receive messages transmitted as a modulated carrier RCC signals using a second protocol, decoder means for decoding both FM subcarrier and RCC protocols and for extracting the message received using either FM subcarrier or RCC protocols, logic means for controlling which of said front ends is operative at any particular time and for controlling the frequency which the system receives at any particular time, said logic means including means to normally maintain one of said front ends active and for switching to said other front end if no signal is received on said active front end, and means for switching said decoder means between FM subcarrier and RCC protocols in response to said flag in the data received by the active receiver.

2. A paging receiver for operation with a system which integrates a plurality of transmitters which transmit the same paging message in time offset fashion, some of said plurality of transmitters, transmitting said messages using a first protocol on FM subcarrier signals and some of said plurality of transmitters, transmitting said messages using a second protocol as modulated RCC signals, at least one of said protocols including a flag indicating the type of protocol, said receiver including, a first front end that can receive messages transmitted on an FM subcarrier, . a second front end that can receiver messages transmitted as a modulated carrier RCC signals, logic means for controlling which of said front ends is operative and for controlling the frequency and protocol which the system receives at any particular time, said logic means switching to a different front end when no signals are received by the front end active at a particular time, said logic means being responsive to said flag to switch between protocols, decoder means for decoding the protocol and extracting the message received on the particular frequency being received at any particular time.

3. The system recited in claim 1 wherein said messages are transmitted utilizing a time slot protocol according to which each receiver is only activated during an assigned time slot.

4. The paging receiver recited in claim 2 wherein said messages are transmitted utilizing a time slot protocol according to which each receiver is only activated during an assigned time slot.

5. The system recited in claim 1 wherein said logic means comprises a microprocessor.

6. The paging receiver recited in claim 2 wherein said logic means comprises a microprocessor.

7. A paging receiver for operation with a system which integrates a plurality of transmitters each operating at a different frequency, which transmit the same paging message in time offset fashion, some of said plurality of transmitters transmitting said messages on FM subcarrier signals using a first protocol and some of said plurality of transmitters transmitting said messages as modulated RCC signals using a second protocol, at least one of said protocols including a flag indicating the type of protocol, said receiver including, a front end that can receive messages transmitted on both an FM subcarrier and modulated RCC signals.

decoder means for decoding the protocol and extracting the message received on the particular frequency being received at any particular time, logic means for controlling said front end and for controlling the frequency which the system receives at any particular time, said logic means including means for switching said front end to a different frequency if no message signals are received on the frequency active at a particular time, and means for switching said decoder means to a different protocol in response to said flag.

* * * * *